United States Patent
Frandsen (10) Patent No.: US 9,479,626 B2
(45) Date of Patent: Oct. 25, 2016

(54) SYSTEM AND METHOD FOR ESTIMATING DISCONNECTION CAUSES BETWEEN A BASE UNIT AND WIRELESS HEADSET AND REACTING THERETO

(71) Applicant: GN Netcom A/S, Ballerup (DK)

(72) Inventor: Otto H. Frandsen, Ballerup (DK)

(73) Assignee: GN Audio A/S (DK)

( * ) Notice: Subject to any disclaimer, the term of this patent is extended or adjusted under 35 U.S.C. 154(b) by 0 days.

(21) Appl. No.: 14/686,007

(22) Filed: Apr. 14, 2015

(65) Prior Publication Data

US 2015/0304471 A1  Oct. 22, 2015

(30) Foreign Application Priority Data

Apr. 16, 2014 (EP) ..................................... 14164962

(51) Int. Cl.
| | | |
|---|---|---|
| *H04B 7/00* | (2006.01) | |
| *H04M 1/60* | (2006.01) | |
| *H04M 1/725* | (2006.01) | |
| *H04W 4/00* | (2009.01) | |
| *H04W 52/38* | (2009.01) | |

(52) U.S. Cl.
CPC ....... *H04M 1/6066* (2013.01); *H04M 1/72502* (2013.01); *H04M 1/72516* (2013.01); *H04W 4/008* (2013.01); *H04W 52/38* (2013.01); *H04M 2250/02* (2013.01); *H04M 2250/08* (2013.01); *H04M 2250/12* (2013.01)

(58) Field of Classification Search
CPC ....................... H04M 1/7253; H04M 1/72516; H04M 11/04; H04M 1/6066; H04M 1/6075; H04M 1/72541; H04M 1/72552; H04M 1/72566; H04M 2250/02; H04M 4/008; H04M 76/06; H04M 88/02; H04M 24/08; H04M 48/18; H04M 4/02; H04M 4/22; H04M 52/0261; H04M 64/003; H04M 76/007; H04M 76/02; H04M 76/026; H04M 88/06

See application file for complete search history.

(56) References Cited

U.S. PATENT DOCUMENTS

| | | | |
|---|---|---|---|
| 2002/0132585 A1 | 9/2002 | Palermo et al. | |
| 2005/0057359 A1 | 3/2005 | Coffey et al. | |
| 2008/0085735 A1* | 4/2008 | Lin ........................ | G08B 21/24 455/556.1 |
| 2011/0306393 A1 | 12/2011 | Goldman et al. | |
| 2013/0086397 A1* | 4/2013 | Uchida .................... | G06F 1/266 713/300 |
| 2015/0270730 A1* | 9/2015 | Mittal ................... | H02J 7/0047 455/573 |
| 2015/0281985 A1* | 10/2015 | Cavallaro ............. | H04W 24/08 455/41.2 |

OTHER PUBLICATIONS

European Search Report for European application No. 14164962.4 dated Aug. 1, 2014.

* cited by examiner

*Primary Examiner* — Golam Sorowar

(74) *Attorney, Agent, or Firm* — Altera Law Group, LLC (57) ABSTRACT

The present invention is directed to, amongst other things, detection of the causes of communications failures primarily between a base station and wireless headset and then taking action in response thereto, such as notifying the user wearing the headset. The wireless telephone sound interface device (2, 22) is characterized in that the device controller (41) further is adapted to estimate a disconnection cause for said disconnection and to control the electronic circuit (42-49) in dependence on the estimated disconnection cause.

This may allow the wireless telephone sound interface device (2, 22) to avoid superfluously alerting the user of a disconnection deliberately caused by the user and may thus aid in reducing daily annoyance of the user and/or of colleagues in a working environment.

15 Claims, 4 Drawing Sheets

SYSTEM AND METHOD FOR ESTIMATING DISCONNECTION CAUSES BETWEEN A BASE UNIT AND WIRELESS HEADSET AND REACTING THERETO

TECHNICAL FIELD

The present invention relates to a wireless telephone sound interface device, to a wireless telephone sound system and to a method for operating a wireless telephone sound interface device. The invention may advantageously be utilized in telephone devices connected to telephone networks and having a base unit wirelessly connected to one or more wireless sound interface devices.

BACKGROUND ART

US patent application 2011/306393 discloses a headset system with a headset base unit and a wireless headset. The headset base unit comprises a housing, a headset holder and a display device with a touch-screen display. When not in use, the headset may be arranged on the headset holder. The headset system can be connected to a number of telecommunication terminals or devices, such as a desk phone, a PC and a mobile phone. The headset base unit also comprises a speaker for generating an audible feedback to the user when operating the touch display and to signal e.g. an incoming soft phone call on the PC. The desk phone and the PC may each be connected to the headset base unit via wires, while the mobile phone may be connected via a wireless connection, such as e.g. a Bluetooth™ connection. The wireless connection between the headset and the headset base unit may e.g. be a DECT connection or a Bluetooth connection. The headset may also be connected directly to the mobile phone, e.g. via a Bluetooth connection. The desk phone may be a DECT wireless telephone with a phone base and a wireless handset connected thereto via a DECT connection. The headset base unit and the phone base may further be connected via a second DECT connection, and the headset base unit and the handset may further be connected via a third DECT connection.

Wireless telephone sound interface devices, such as the wireless headset and the wireless handset described above, may occasionally lose the wireless connection to their base unit. When this happens, known wireless telephone sound interface devices typically alert the user about the disconnection by means of audible and/or visible signals. This reaction may, however, not always be appropriate and may thus cause annoyance for a user and for other persons in the vicinity.

DISCLOSURE OF INVENTION

It is an object of the present invention to provide a wireless telephone sound interface device and a wireless telephone sound system that react appropriately in more cases of connection loss than the prior art devices and systems. It is a further object of the present invention to provide a method for operating a wireless telephone sound system that does not suffer from disadvantages of prior art methods.

These and other objects of the invention are achieved by the invention defined in the independent claims and further explained in the following description. Further objects of the invention are achieved by embodiments defined in the dependent claims and in the detailed description of the invention.

Within this document, the term "sound interface" refers to an interface suitable for transmitting a sound signal to a user in dependence on an audio output signal and/or for providing an audio input signal in dependence on a voice sound received from a user. The term "sound interface device" refers to an audio device that provides and/or comprises a sound interface. A sound interface device thus comprises a sound transmitter and/or a sound receiver. A sound transmitter preferably comprises one or more sound output transducers for providing said sound signal in dependence on said audio output signal. A sound receiver preferably comprises one or more input transducers for providing said audio input signal in dependence on said received voice sound. Examples of suitable output sound transducers include loudspeaker drivers and vibrators based on e.g. electrodynamic, electromagnetic, electrostatic, piezoelectric and/or thermoelectric principles. Examples of suitable input sound transducers include microphones and vibration sensors based on e.g. electrodynamic, electromagnetic, electrostatic, piezoelectric, thermoelectric and/or optical principles.

The term "telephone sound interface device" refers to a sound interface device suitable for use as a sound interface during telephone conversations. The term "wireless telephone sound interface device" refers to a telephone sound interface device wirelessly connectable to a base unit for conducting telephone conversations with other parties through a telephone network. Examples of wireless telephone sound interface devices include wireless handsets, wireless headsets, wireless loudspeaker devices, wireless microphone devices and wireless speakerphones. Telephone sound interface devices are sometimes referred to as "audio endpoints", e.g. in connection with Internet-based systems and software providing telephony services through personal computers (PC) and smartphones.

A base unit may convey audio signals between a first group of one or more wireless telephone sound interface devices and a second group of one or more telephone networks. A base unit may be connected to a telephone network through a telephone gateway. A base unit and a telephone gateway may be interconnected by wires or by wireless connections, such as e.g. radio frequency connections and/or optical connections.

A telephone gateway may comprise a converter for converting telephone signals received from a telephone network into audio and/or control signals that may be provided to a base unit and/or a converter for converting audio and/or control signals received from a base unit into telephone signals that may be provided to a telephone network. A telephone gateway may further comprise a signaling controller adapted to exchange control signals with a telephone network in order to receive, maintain, reject, terminate and/or initiate telephone calls through the telephone network. The signaling controller may preferably perform the exchange of control signals with the telephone network such that the telephone gateway can relieve a connected base unit of at least a portion of the control signaling required by the telephone network. Thus, a connected base unit may be used in telephone conversations even in the case that it is only capable of handling a subset—or none at all—of the control signals of the telephone network. Examples of devices that may comprise or constitute a telephone gateway include desktop, laptop and tablet computers, desktop telephones, mobile or cell phones, smartphones and personal digital assistants. A base unit may comprise a telephone gateway and may thus be directly connectable to a telephone network. Examples of such base units include e.g. many known base units for DECT handsets, desktop telephones with wireless headsets and mobile phones with Bluetooth headsets.

The terms "sound" and "sound signal" refer to signals propagating in media by means of pressure variations. The term "audio signal" refers to a signal directly or indirectly derived from a sound signal and/or intended to be directly or indirectly transformed into a sound signal. An audio signal may itself be a sound signal. An audio signal may constitute or comprise an arbitrary representation of a sound signal, such as e.g. an electric signal, an optical signal, a radio frequency signal, an inductive signal, a capacitive signal or an ultrasound signal, and the sound signal may be represented or encoded e.g. as an analog signal, a digital signal, a modulated signal etc. The term "audio connection" refers to a wired or wireless connection suitable for transmitting one or more audio signals.

Within this document, the singular forms "a", "an", and "the" are intended to include the plural forms as well (i.e. to have the meaning "at least one"), unless expressly stated otherwise. Likewise, the term "any" is intended to include both the singular and the plural form, unless expressly stated otherwise. Correspondingly, the terms "has", "includes", "comprises", "having", "including" and "comprising" specify the presence of respective features, operations, elements and/or components, but do not preclude the presence or addition of further entities. The term "and/or" generally includes any possible combination of one or more of the associated items. Steps or operations of any method disclosed herein need not be performed in the order disclosed, unless this is expressly stated.

Furthermore, when an element or entity is referred to as being "connected" or "coupled" to another element or entity, this includes direct connection (or coupling) as well as connection (or coupling) via intervening elements or entities, unless expressly stated otherwise. Also, unless expressly stated otherwise, when a signal is referred to as being "provided" or "conveyed" by a first entity to a second entity, this includes directly or indirectly transmitting the signal in its original form as well as any direct or indirect transmission that modifies the original signal and/or converts the signal into another domain and/or representation before it arrives at the second entity, provided that the information comprised by the signal received by the second entity is sufficient for the second entity to perform the specified actions with respect to the signal.

Ordinal attributes like "first", "second", "primary", "secondary", "main" and "auxiliary" are intended to allow distinguishing between different entities, and should not be construed as implying any order, hierarchy, dependency or precedency unless expressly stated otherwise.

BRIEF DESCRIPTION OF THE DRAWINGS

The invention will be explained in more detail below in connection with preferred embodiments and with reference to the drawings in which.

The figures are schematic and simplified for clarity, and they just show details essential to understanding the invention, while other details may be left out. Where practical, like reference numerals or literal identifiers are used for identical or corresponding parts.

MODE(S) FOR CARRYING OUT THE INVENTION

Figure 1:
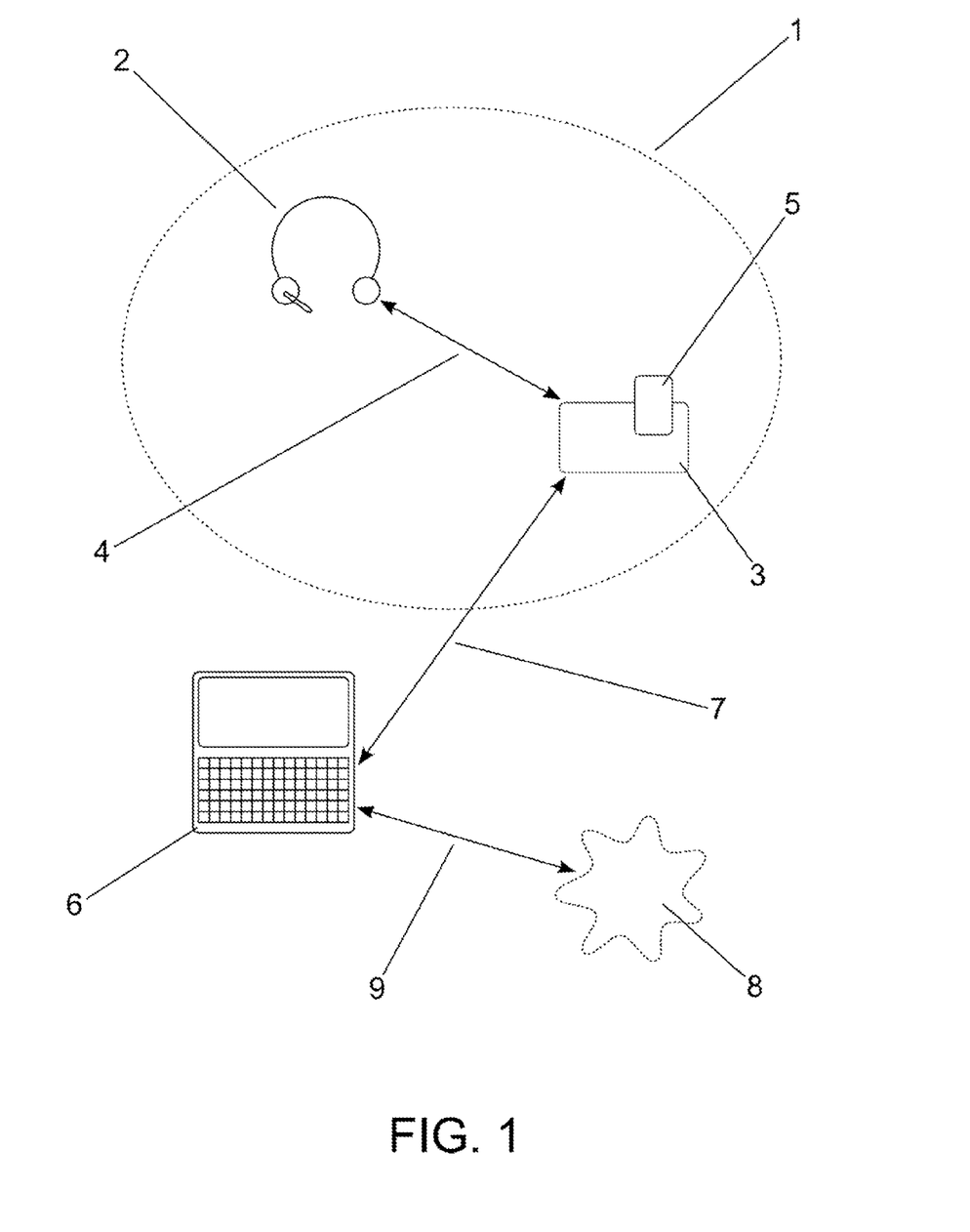
FIG. 1 shows a first embodiment of a wireless telephone sound system according to the invention.

The wireless telephone sound system 1 shown in FIG. 1 comprises a wireless headset 2 and a headset base unit 3 interconnected through a Bluetooth connection 4. The headset base unit 3 comprises a headset cradle 5 for holding the wireless headset 2 when the wireless headset 2 is not in use. The headset base unit 3 is connected to a laptop computer 6 through a USB connection 7. The laptop computer 6 is connected to an IP telephony network 8 through an LAN connection 9. The laptop computer 6 comprises hard- and software (not shown) allowing it to function as a telephone gateway between the headset base unit 3 and the IP telephony network 8.

The wireless headset 2 and the headset base unit 3 exchange audio and control signals through the Bluetooth connection 4 such that they can be used as a sound interface during telephone conversations with one or more remote parties through the laptop computer 6, the LAN connection 9 and the IP telephony network 8. The headset base unit 3 receives electric power from the laptop computer 6 through the USB connection 7.

Figure 2:
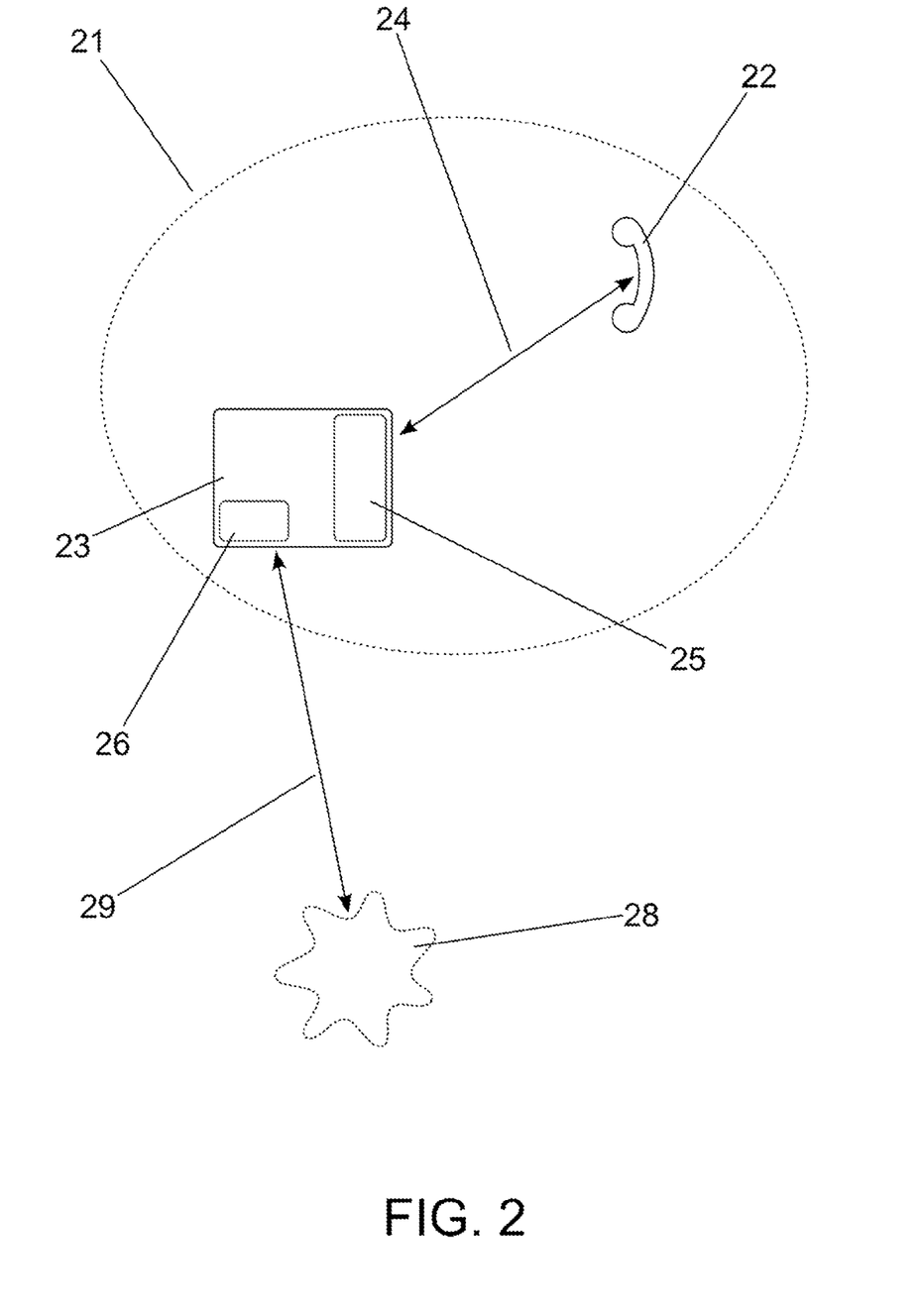
FIG. 2 shows a second embodiment of a wireless telephone sound system according to the invention.

The wireless telephone sound system 21 shown in FIG. 2 comprises a wireless handset 22 and a handset base unit 23 interconnected through a DECT connection 24. The handset base unit 23 comprises a handset cradle 25 for holding the wireless handset 22 when the wireless handset 22 is not in use. The handset base unit 23 comprises a telephone gateway 26 connected to a public subscriber telephone network (PSTN) 28—or another kind of landline telephone network—through a telephone cord 29. The wireless handset 22 and the handset base unit 23 exchange audio and control signals through the DECT connection 24 such that they can be used as a sound interface during telephone conversations with one or more remote parties through the telephone gateway 26, the telephone cord 29 and the PSTN 28. The handset base unit 23 receives electric power from an adapter (not shown) connected to a mains outlet (not shown).

Figure 3:
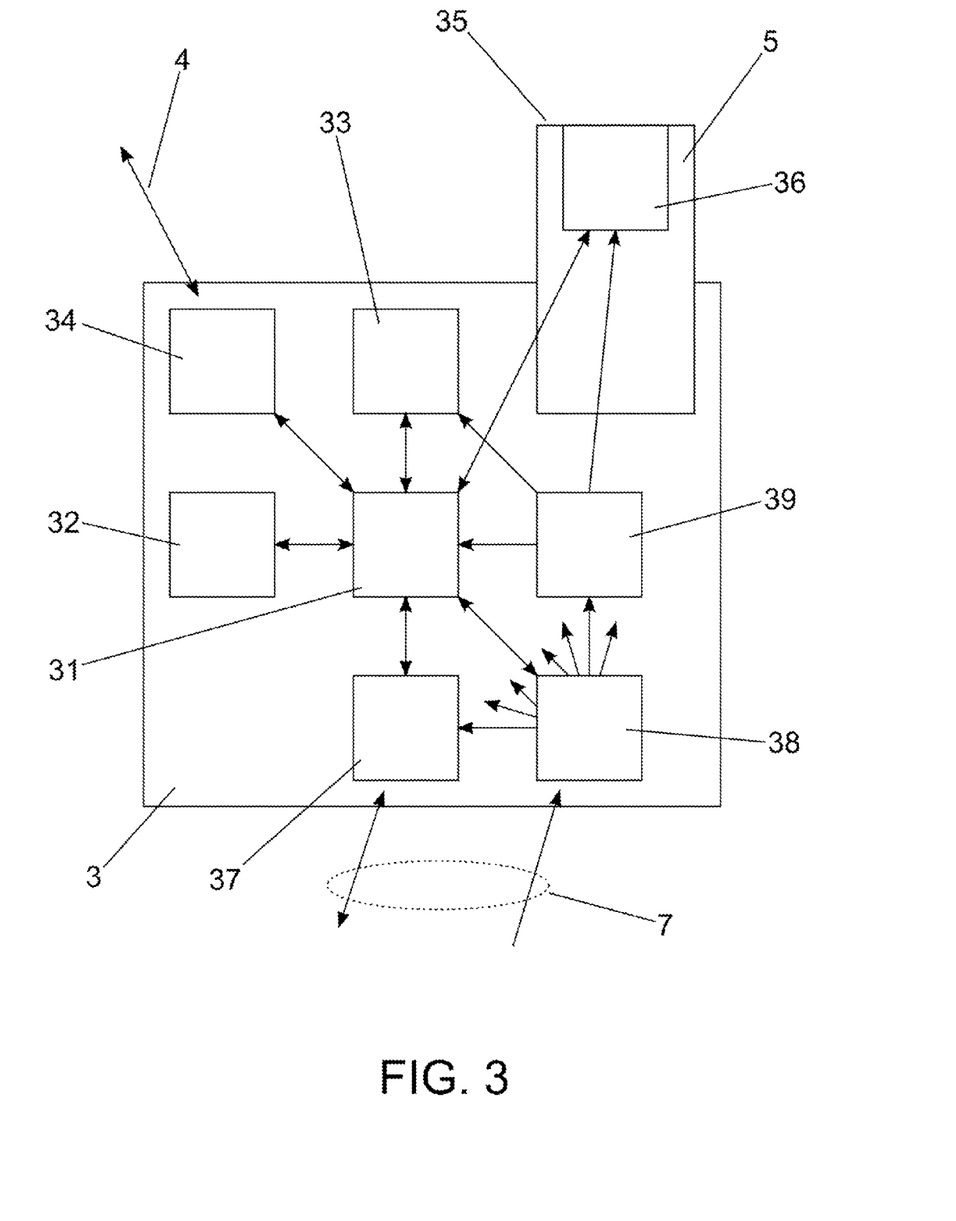
FIG. 3 shows details of a headset base unit shown in FIG. 1.

The headset base unit 3 shown in FIG. 3 comprises a base controller 31, a user interface 32, an alerting means 33, a Bluetooth transceiver 34, a headset cradle 5 with a docking interface 35 and a charging circuit 36, a USB transceiver 37, a power interface 38, and a rechargeable power storage 39. The base controller 31 controls the operation of the headset base unit 3 and its components 32-39 by providing control signals to one or more of the base unit components 32-39 in dependence on status signals received from one or more of the base unit components 32-39. The user interface 32 comprises a touch screen display (not shown) for communicating with a user of the wireless telephone sound system 1. The alerting means 33 comprises a speaker driver (not shown) and a signal generator (not shown) arranged, connected and adapted to provide one or more acoustic signals for alerting the user.

During telephone conversations, the Bluetooth transceiver 34 exchanges audio and control signals with the wireless headset 2 through the Bluetooth connection 4, and the USB transceiver 37 exchanges audio and control signals with the laptop computer 6 through the USB connection 7. The base controller 31 conveys audio and control signals between the Bluetooth transceiver 34 and the USB transceiver 37, such that the base unit 3 can function as a conventional base unit that conveys audio and control signals between the wireless headset 2 and the laptop computer 6.

The docking interface 35 comprises one or more holding means (not shown) that allow establishing of a stable mechanical connection to the wireless headset 2. For this purpose the holding means may e.g. comprise one or more surfaces specially shaped or adapted to hold a wireless headset 2 with a specific shape and/or one or more magnets and/or ferromagnetic materials for attracting corresponding magnets or ferromagnetic materials comprised by the wireless headset 2. The charging circuit 36 provides electric power to the wireless headset 2 when the wireless headset 2 is positioned in the headset cradle 5. The charging circuit 36 may comprise two or more electrical contacts (not shown), one or more electrodes (not shown) and/or one or more coils (not shown) and may provide the electric power in the form of a direct current, an alternating current, an alternating capacitively coupled electric field and/or an alternating inductively coupled magnetic field. Magnets comprised by the holding means may also serve as such electric contacts or electrodes for charging the wireless headset 2.

The power interface 38 receives electric power from the laptop computer 6 through the USB connection 7 and supplies the received electric power to the base unit components 31-39, where required after one or more voltage conversions. The rechargeable power storage 39 is connected to receive electric power from the power interface 38 and is adapted to provide electric power at least to the alerting means 33, primarily when the power interface 38 does not receive electric power through the USB connection 7. The rechargeable power storage 39 may e.g. comprise a rechargeable battery for storing the received electric power.

Figure 4:
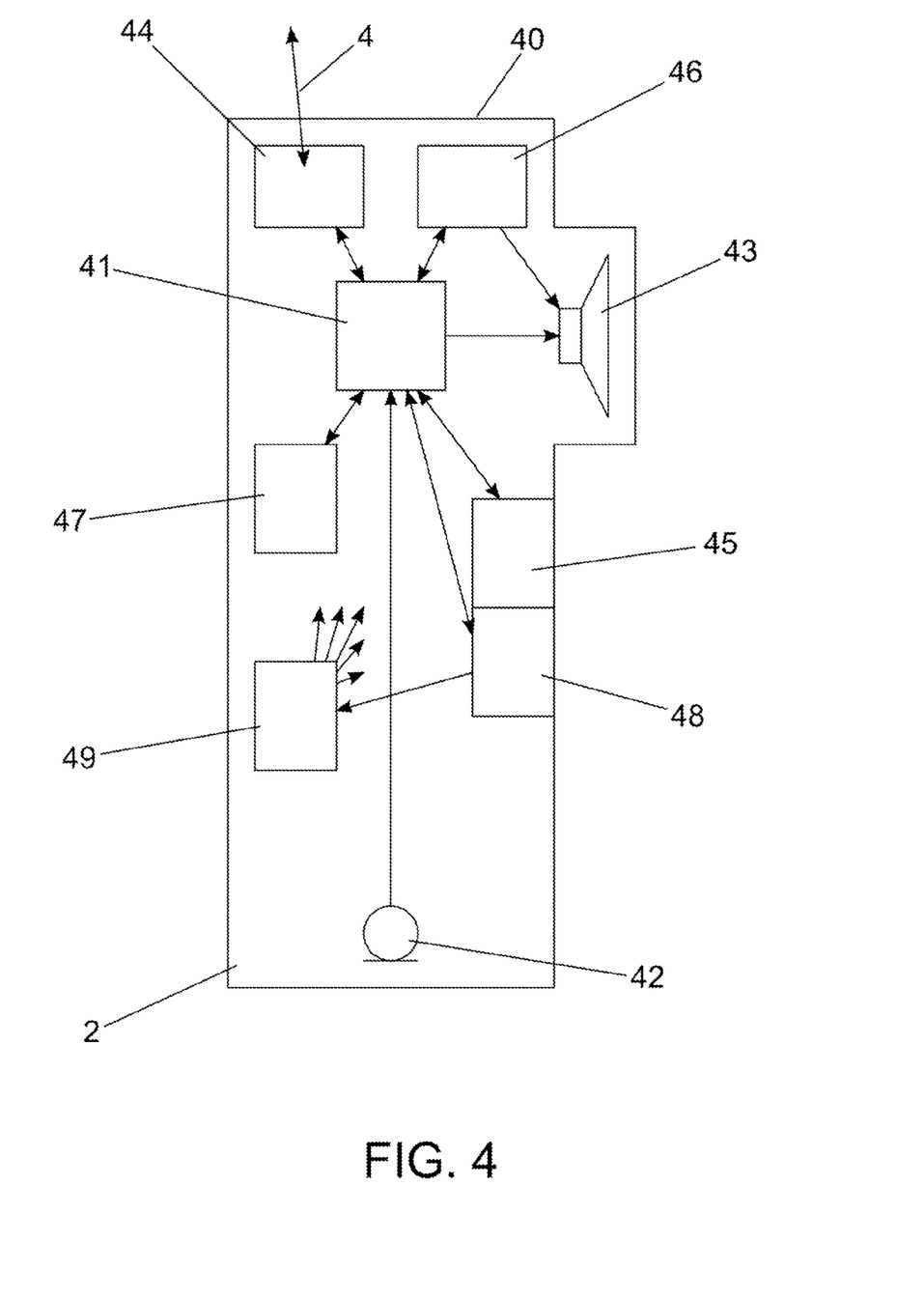
FIG. 4 shows details of a wireless headset shown in FIG. 1.

The wireless headset 2 shown in FIG. 4 comprises a housing 40, a sound-device controller 41, a microphone 42, a speaker driver 43, a Bluetooth transceiver 44, a docking sensor 45, a signal generator 46, a motion sensor 47, a charging interface 48 and a rechargeable power storage 49. The housing 40 holds and protects the other components 41-49 of the wireless headset 2. The sound-device controller 41 controls the operation of the wireless headset 2 and its components 42-49 by providing control signals to one or more of the headset components 42-49 in dependence on status signals received from one or more of the headset components 42-49. During telephone conversations, the microphone 42 receives voice signals from the user and provides corresponding audio input signals to the Bluetooth transceiver 44 through the sound-device controller 41, the speaker driver 43 provides sound signals to the user in dependence on audio output signals received from the Bluetooth transceiver 44 through the sound-device controller 41, and the Bluetooth transceiver 44 exchanges audio and control signals with the headset base unit 3 through the Bluetooth connection 4.

The housing 40 comprises one or more surfaces (not shown) which are shaped or adapted to abut one or more corresponding surfaces of the docking interface 35 of the headset base unit 3 when the wireless headset 2 is placed in a docking position in the headset cradle 5. The housing 40 may alternatively or additionally comprise one or more magnets and/or ferromagnetic materials for holding the wireless headset 2 in the docking position. The docking sensor 45 detects whether the wireless headset 2 is in the docking position or not and provides a corresponding docking signal to the sound-device controller 41. The signal generator 46 generates an alert audio signal in dependence on an alert control signal from the sound-device controller 41 and provides the alert audio signal to the speaker driver 43 which transmits a corresponding acoustic alert signal to the user. The motion sensor 47 detects whether the wireless headset 2 is being moved and provides a corresponding motion signal to the sound-device controller 41.

When the wireless headset 2 is in the docking position, the charging interface 48 receives electric power from the headset base unit 3. For this purpose, the charging interface 48 may comprise two or more electrical contacts (not shown), one or more electrodes (not shown) and/or one or more coils (not shown) for receiving the electric power in the form of a direct current, an alternating current, an alternating capacitively coupled electric field and/or an alternating inductively coupled magnetic field provided by corresponding electrical contacts, electrodes and/or coils of the headset base unit 3. Magnets and/or ferromagnetic materials arranged in the housing for holding the wireless headset 2 in the docking position may also be used as electrical contacts or electrodes for receiving the electric power. The charging interface 48 supplies the received electric power to the rechargeable power storage 49, which in turn supplies electric power to the headset components 42-47, where required after one or more voltage conversions. The rechargeable power storage 49 may e.g. comprise a rechargeable battery for storing the received electric power.

FIG. 1 and FIG. 2 illustrate two different embodiments of a wireless telephone sound system 1, 21 according to the invention, namely a wireless headset system 1 and a wireless handset system 21. FIG. 3 and FIG. 4 illustrate components of the embodiment illustrated in FIG. 1. In many aspects, however, the composition and the operation of the two illustrated systems 1, 21 are similar, and although based on FIG. 3 and FIG. 4, the following description is in general applicable to both embodiments 1, 21 as well as to further embodiments of the invention falling within the scope of the attached claims. Exceptions to the general applicability are mentioned in the description.

In the following, the term "sound device" is used as shorthand for a wireless telephone sound interface device, such as e.g. the wireless headset 2 or the wireless handset 22. Similarly, the term "base unit" refers to a base unit 3, 23 for a sound device 2, 22, the term "cradle" refers to a cradle 5, 25 or another kind of holder for a sound device 2, 22 and the term "wireless base connection" refers to a wireless audio connection 4, 24 between a sound device 2, 22 and the corresponding base unit 3, 23.

Prior art sound devices are known that comprise alerting means adapted to alert the user of a loss of a wireless base connection. In embodiments of the present invention, alerting may preferably be dependent on an estimated cause for the connection loss. For instance, the sound-device controller 41 may detect a disconnection of the wireless base connection 4, 24, estimate a disconnection cause for the detected disconnection and control an alerting means, such as e.g. the signal generator 46 and the speaker driver 43, in dependence on detecting the disconnection and on an estimated disconnection cause. The sound-device controller 41 may detect the disconnection in any way known in the art. For this purpose, the wireless transceiver 44, such as the Bluetooth transceiver 44, a DECT transceiver or any other kind of wireless receiver comprised by the sound device 2, 22 for establishing the wireless base connection 4, 24 and wirelessly communicating with the base unit 3, 23, may preferably provide a link-lost signal to the sound-device controller 41 in dependence on detecting a disconnection of the wireless base connection 4, 24. The sound device 2, 22 preferably comprises one or more detectors or sensors, such as e.g. a docking sensor 45 or a motion sensor 47, each providing a respective sensor signal, and the sound-device controller 41 preferably estimates a disconnection cause in dependence on one or more sensor signals. One or more detectors or sensors may be comprised by a sound-device component 42-49 also comprised by the sound device for other purposes. For instance, the wireless transceiver 44 may provide a Receive Signal Strength Indicator (RSSI) signal or another type of link quality signal, i.e. a sensor signal that indicates the strength or the quality of the wireless signal received from the base unit 3, 23, and the sound-device controller 41 may estimate a disconnection cause in dependence on the link quality signal. Alternatively, or additionally, the power interface 48 may function as docking sensor 45 by providing a power signal, i.e. a sensor signal that indicates whether the power interface 48 receives electric power, and the sound-device controller 41 may treat the power signal as a docking signal and estimate a disconnection cause in dependence on the power signal. Alternatively, or additionally, the wireless transceiver 44 may receive a predefined signal from the base unit 3, 23 and provide a power-down signal, i.e. a sensor signal indicating a powering-down of the base unit 3, 23, to the sound-device controller 41 in dependence on receiving the predefined signal, and the sound-device controller 41 may estimate a disconnection cause in dependence on the power-down signal.

Alternatively, or additionally, the sound-device controller 41 may control one or more other electronic circuits, such as e.g. one or more of the sound interfaces 42, 43, the wireless transceiver 44, the motion sensor 47, the charging interface 48, the rechargeable power storage 49 and/or a user interface (not shown) comprised by the sound device 2, 22, in dependence on detecting a disconnection and on an estimated disconnection cause.

Preferably, the sound-device controller 41 is able to distinguish between at least two different disconnection causes and react differently in dependence on which disconnection cause or causes are estimated as causing a detected disconnection. In particular, it may be advantageous that the sound-device controller 41 is able to distinguish at least between a detected disconnection being caused by the user moving the sound device 2, 22 outside the communication range of the base unit 3, 23 and the detected disconnection being caused by a power-down of the base unit 3, 23. Preferably, the sound-device controller 41 is further able to distinguish between a detected disconnection being caused by a user-initiated power-down of the base unit 3, 23 and a power-down of the base unit 3, 23 that was not initiated by the user. Correspondingly, the sound-device controller 41 preferably estimates a disconnection cause as one of multiple predefined disconnection causes and controls one or more electronic circuits 42-49 in dependence on an estimated disconnection cause. Preferably, the predefined disconnection causes comprise range violation, i.e. an indication that a disconnection was estimated to be caused by an exceeding of the communication range of the wireless audio connection 4, 24, and power-down, i.e. an indication that a disconnection was estimated to be caused by a power-down of the base unit 3, 23. Instead of, or in addition to, the latter cause, the predefined disconnection causes may preferably comprise user-initiated power-down, i.e. an indication that a disconnection was estimated to be caused by a user-initiated power-down of the base unit 3, 23, and non-user-initiated power-down, i.e. an indication that a disconnection was estimated to be caused by a power-down of the base unit 3, 23 that was not initiated by the user.

The sound device 2, 22 may be able to operate in different power modes of which at most one is prevailing at a time. The power modes preferably comprise a power-off mode wherein the sound device 2, 22 is generally non-operable and from which reception of wireless signals through the wireless base connection 4, 24 does not suffice to have the sound device 2, 22 enter another power mode. Preferably, the sound device 2, 22 may be adapted to require manual interaction and/or mechanical interaction therewith, such as activating a button or moving the sound device 2, 22, to have it enter another power mode from the power-off mode. The power modes preferably comprise a sleep mode wherein the sound device 2, 22 is generally non-operable and from which reception of wireless signals through the wireless base connection 4, 24 suffices to have the sound device 2, 22 enter another power mode. The power modes preferably comprise an active mode wherein the sound device 2, 22 repeatedly exchanges wireless signals with the base unit 3, 23 through the wireless base connection 4, 24. Preferably, the sound-device controller 41 controls the power mode of the sound device 2, 22 in dependence on status signals received from one or more sound-device components 42-49, e.g. by providing corresponding control signals to one or more sound-device components 42-49, in particular to the rechargeable power storage 49.

The sound device 2, 22 may preferably comprise a user interface (not shown) that may provide information about device status and/or detected events to the user and/or accept input from the user in order to allow the user to control operation of the sound device 2, 22. The user interface may e.g. allow the user to accept and reject incoming calls as well as to wake up the sound device 2, 22 from a sleep mode and/or from a power-off mode and thus cause the sound device 2, 22 to enter an active mode. The user interface is preferably controlled by the sound-device controller 41, and the user interface preferably forwards user input to the sound-device controller 41, which controls operation of the sound-device components 42-49 in response hereto.

A user interface 32 comprised by any of the sound device 2, 22 and the base unit 3, 23 is preferably adapted to provide the information in visual, acoustic and/or tactile form. The user interface is preferably adapted to provide information to the user in response to receiving one or more control signals. A user interface 32 may preferably comprise one or more sensors, such as e.g. an optical sensor, a sound sensor, a touch sensor, a proximity sensor and/or a motion sensor, and is preferable adapted to detect one or more predefined user actions—and preferably further to distinguish between different user actions, in dependence on one or more output signals received from one or more of the sensors. The user interface 32 is preferably adapted to provide one or more status signals in response to detecting one or more corresponding different predefined user actions. A user interface 32 may comprise any combination of user interface components of any known type, such as e.g. lamps, LEDs, LCD display, software controlled displays, character displays, graphic displays, touch screens, buttons, keys, sliders, touch controls, audio signaling devices, voice signaling devices, voice recognition devices etc.

Preferably, the sound-device controller 41 may cause the alerting means 43, 46 to provide an alert signal in dependence on an estimated disconnection cause. For instance, the sound-device controller 41 may cause the alerting means 43, 46 to provide an alert signal indicating a loss of connection in dependence on estimating a disconnection cause to be a range violation. Conversely, the sound-device controller 41 may cause the alerting means 43, 46 to refrain from providing an alert signal in dependence on estimating a disconnection cause to be a power-down of the base unit 3, 23. This may help to avoid superfluously alerting the user of events deliberately caused by the user and may thus aid in reducing daily annoyance of the user and/or of colleagues in a working environment. A further improvement may be achieved by refining the reaction to power-down of the base unit 3, 23 depending on whether the power-down was estimated to be user-initiated or not. In the former case, the sound-device controller 41 preferably causes the alerting means 43, 46 to refrain from providing an alert signal, while in the latter case, the sound-device controller 41 preferably causes the alerting means 43, 46 to provide an alert signal. This may allow the user to be alerted when the base unit 3, 23 is powered down due to an error, while avoiding annoying the user when the user initiated the power-down.

Alternatively, or additionally, the sound-device controller 41 may control the operation mode of the wireless transceiver 44 in dependence on an estimated disconnection cause. The wireless transceiver 44 is preferably operable at least in a first mode wherein it reacts to wireless signals from the base unit 3, 23 and in a second mode wherein it does not react to wireless signals from the base unit 3, 23. The sound-device controller 41 may for instance cause the wireless transceiver 44 to remain in the first mode in dependence on estimating a disconnection cause to be a range violation, while causing the wireless transceiver 44 to enter the second mode in dependence on estimating a disconnection cause to be a power-down of the base unit 3, 23. In the latter case, the sound-device controller 41 preferably also causes the sound device 2, 22 to enter its sleep mode or its power-off mode. This may allow the sound device 2, 22 to save energy by avoiding connection attempts after a power-down of the base unit 3, 23. In the case that the sound-device controller 41 can further distinguish between user-initiated and non-user-initiated power-down of the base unit 3, 23, the sound-device controller 41 preferably causes the sound device 2, 22 to enter its sleep mode—without causing the wireless transceiver 44 to enter the second mode—in dependence on estimating a disconnection cause to be a non-user-initiated power-down of the base unit 3, 23 and causes the sound device 2, 22 to enter its power-off mode—with the wireless transceiver 44 in the second mode—in dependence on estimating a disconnection cause to be a user-initiated power-down of the base unit 3, 23. In this way, the user does not need to perform manual interaction with the sound device 2, 22 to wake it up after the base unit 3, 23 has only temporarily been powered down due to an error.

The sound-device controller 41 may preferably estimate a disconnection cause in dependence on the motion signal from the motion sensor 47. If the sound-device controller 41 detects a connection loss while the motion signal indicates that the sound device 2, 22 is being moved, there is a high likelihood that the disconnection cause is a range violation and the sound-device controller 41 may thus preferably estimate the disconnection cause as a range violation in dependence on detecting this condition. When the motion signal indicates otherwise, the sound-device controller 41 may preferably estimate a different disconnection cause.

The sound-device controller 41 may preferably estimate a disconnection cause in dependence on the link quality signal from the wireless transceiver 44. If the sound-device controller 41 detects a connection loss while the link quality signal indicates that the quality and/or the strength of the signal received from the base unit 3, 23 is fading or slowly decreasing, there is a high likelihood that the disconnection cause is a range violation and the sound-device controller 41 may thus preferably estimate the disconnection cause as a range violation in dependence on detecting this condition. When the link quality signal indicates otherwise, the sound-device controller 41 may preferably estimate a different disconnection cause.

The sound-device controller 41 may preferably estimate a disconnection cause in dependence on the docking signal from the docking sensor 45. If the sound-device controller 41 detects a connection loss while the docking signal indicates that the sound device 2, 22 is in the docking position, there is a high likelihood that the disconnection cause is a power-down and the sound-device controller 41 may thus preferably estimate the disconnection cause as a power-down in dependence on detecting this condition. The docking sensor 45 may e.g. comprise one or more mechanical, optical or electrical sensors (not shown) that detect whether the sound device 2, 22 has a mechanical and/or an electrical connection to the base station 3, 23. Alternatively, or additionally, the docking sensor 45 may detect this in dependence on a power signal as described further above. When the docking signal or the power signal indicates otherwise, the sound-device controller 41 may preferably estimate a different disconnection cause.

The sound-device controller 41 may estimate a disconnection cause in dependence on a power-down signal from the wireless transceiver 44. If the sound-device controller 41 detects a connection loss and receives a power-down signal within a short time period, such as a time period shorter than 5 s or shorter than 2 s, there is a high likelihood that the disconnection cause is a power-down and the sound-device controller 41 may thus preferably estimate the disconnection cause as a power-down in dependence on detecting this condition. In the absence of a power-down signal, the sound-device controller 41 may preferably estimate a different disconnection cause.

The sound-device controller 41 may estimate a disconnection cause in dependence on multiple of the sensor signals, such as e.g. on the motion signal and the link quality signal, on the motion signal and the docking signal, on the motion signal and the power-down signal, on the link quality signal and the docking signal, on the link quality signal and the power-down signal and/or on any combination of two, three, four or more sensor signals. The sound-device controller 41 may alternatively combine individual cause estimates for each of multiple sensor signals into a combined estimated disconnection cause. Also, the sound-device controller 41 may preferably weight sensor signals differently, for instance to emphasize the power-down signal over other sensor signals.

The sound-device controller 41 may further—preferably with priority—estimate a disconnection cause to be a range violation or a non-user-initiated power-down when detecting a connection loss while the sound device 2, 22 is engaged in a telephone conversation, since in this case, it is rather unlikely that the user has deliberately powered off the base unit 3, 23.

The sound-device controller 41 may apply any known signal processing methods to the audio signals conveyed between sound-device components 42-49, in particular to those conveyed to and from the wireless transceiver 44, as already known in the art.

In order to enable the wireless transceiver 44 to provide a power-down signal to the sound-device controller 41, the base unit 3, 23 preferably transmits a predefined signal to the sound device 2, 22 in dependence on detecting a pending or threatening power-down. The base controller 31 of the base unit 3, 23 thus preferably monitors one or more of the base unit components 32-39 and, upon detecting a pending or threatening power-down, causes the wireless transceiver 34 of the base unit 3, 23 to transmit the predefined signal. The base controller 31 may for instance detect this condition in dependence on a power signal from the power interface 38 indicating a decrease in the received electric power or voltage. Alternatively, or additionally, the base controller 31 may detect this condition in dependence on receiving a signal from the user interface 32 indicating that the user has entered a predefined command to power down the base unit 3, 23. The base controller 31 preferably determines whether the power-down was initiated by the user and causes the wireless transceiver 34 to provide corresponding information in the predefined signal sent to the sound device 2, 22, thus allowing the sound-device controller 41 to distinguish between user-initiated power-down and non-user-initiated power-down.

Additionally, or alternatively, the wireless transceiver 34 of the base unit 3, 23 may transmit an RSSI signal or another type of a link quality signal to the wireless transceiver 44 of the sound device 2, 22, and the wireless transceiver 44 of the sound device 2, 22 may determine the link quality signal provided to the sound-device controller 41 in dependence on the link quality signal received from the base unit 3, 23.

The alerting means 33, 43, 46 of any of the sound device 2, 22 and the base unit 3, 23 may transmit visual, acoustic and/or tactile alert signals and may thus comprise corresponding signal generators and signal transmission means as already known in the art. A user interface 32 comprised by any of the sound device 2, 22 and the base unit 3, 23 may function as alerting means 33, 43, 46.

The base controller 31 may control the alerting means 33 of the base unit 3, 23 to function in a similar way as the alerting means 43, 46 of the sound device 2, 22, such that it transmits one or more alert signals in dependence on an estimated disconnection cause. For this purpose, the base controller 31 may apply estimation of a disconnection cause in a similar way as the sound-device controller 41. In particular, the base controller 31 may cause the alerting means 33 of the base unit 3, 23 to provide an alert signal to the user in dependence on detecting a disconnection of the wireless base connection 4, 24 while the sound device 2, 22 is not in the docking position, which may be detected by a docking sensor (not shown) comprised by the base unit 3, 23. This allows the wireless telephone sound system 1, 21 to alert the user of an error in or an unintentional power-down of the sound device 2, 22, for instance due to discharging of the battery. The rechargeable power storage 39 may be used to maintain this alert in the case that the electric power to the base unit 3, 23 is shut off, such that the user can be made aware of a situation in which the base unit 3, 23 cannot reestablish the wireless base connection to the sound device 2, 22 when the base unit 3, 23 eventually receives electric power again.

The sound device 2, 22 and/or the base unit 3, 23 may allow the user to configure the reactions of the respective device 2, 3, 22, 23 to different estimated disconnection causes, e.g. by entering corresponding commands through their respective user interface 32.

The shape of the housing 40 indicated in FIG. 4 suggests that the wireless headset 2 be embodied as a monaural headset adapted for placement at one of the user's ears. The wireless headset 2 may, however, be embodied as any other known type of headset, such as a monaural or binaural headset with a headband or a neckband, or as a binaural set of earphones. Also, a sound device 2, 22 according to the invention may be embodied as a wireless microphone, a wireless speaker, a wireless speakerphone or the like. A sound device 2, 22 or a system 1, 21 according to the invention may comprise any combination of features described further above as generally being or capable of being comprised by a wireless telephone sound interface device or a wireless telephone sound system.

A method for operating a wireless telephone sound interface device 2, 22 may preferably comprise: detecting a disconnection of a wireless audio connection 4, 24 between the wireless telephone sound interface device 2, 22 and a base unit 3, 23; estimating a disconnection cause for said disconnection; and controlling an electronic circuit 42-49 comprised by the wireless telephone sound interface device 2, 22 in dependence on the estimated disconnection cause.

The method may e.g. by executed by a programmable device, such as e.g. a sound-device controller 41, possibly equipped with a computer program comprising instructions for the programmable device enabling or causing the programmable device to execute the method. The computer program may be stored on a non-transitory computer storage medium.

Each of the sound device 2, 22 and the base unit 3, 23 described above preferably comprises one or more electronic circuits, such as e.g. analog circuits, digital circuits, microprocessors, signal processors or the like, adapted to perform the described operations as is already known for similar devices of the prior art. Such electronic circuits are preferably implemented as digital circuits operating on digital signals, but any portions hereof may be implemented as analog circuits operating on analog signals. Where necessary, any of the electronic circuits may comprise analog-to-digital and/or digital-to-analog converters. Functional blocks of digital circuits may be implemented in hardware, firmware or software, or any combination hereof. Digital circuits may perform the functions of multiple functional blocks in parallel and/or in interleaved sequence, and functional blocks may distributed in any suitable way among multiple hardware units, such as e.g. signal processors, microcontrollers and other integrated circuits.

The detailed description given herein and the specific examples indicating preferred embodiments of the invention are intended to enable a person skilled in the art to practice the invention and should thus be seen mainly as an illustration of the invention. The person skilled in the art will be able to readily contemplate further applications of the present invention as well as advantageous changes and modifications from this description without deviating from the scope of the invention. Any such changes or modifications mentioned herein are meant to be non-limiting for the scope of the invention.

The invention is not limited to the embodiments disclosed herein, and the invention may be embodied in other ways within the subject-matter defined in the following claims. As an example, features of the described embodiments may be combined arbitrarily, e.g. in order to adapt the system, the devices and/or the method according to the invention to specific requirements or uses.

It is further intended that the structural features of the system and/or devices disclosed herein may be combined with the methods, when appropriately substituted by a corresponding process. Embodiments of the methods generally have the same advantages as the corresponding systems and/or devices.

Reference numerals and literal identifiers that appear in brackets in the claims are intended to be non-limiting for their scope.

The invention claimed is:

1. A wireless telephone sound interface device comprising:
an electronic circuit;
a first wireless transceiver adapted to exchange audio signals with a base unit through a wireless audio connection; and
a device controller adapted to detect the different causes of disconnection between a disconnection of the wireless audio connection resulting deliberate user action and other causes to control the electronic circuit in dependence on detecting said disconnection, and
wherein the device controller further is adapted to estimate a disconnection cause for said disconnection and to control the electronic circuit in dependence on the estimated disconnection cause and alerting the user only on causes for disconnection which are not deliberately caused;
and wherein the device controller further is adapted to estimate a disconnection cause as one of multiple predefined disconnection causes, the multiple predefined disconnection causes comprising at least a range-violation cause indicating that the disconnection was estimated to be caused by an exceeding of the communication range of the wireless audio connection.

2. The wireless telephone sound interface device according to claim 1, wherein the electronic circuit comprises a first alert signaler adapted to provide visual, acoustic and/or tactile alert signals to a user of the wireless telephone sound interface device, and wherein the first controller further is adapted to cause the first alert signaler to provide an alert signal in dependence on an estimated disconnection cause.

3. The wireless telephone sound interface device according to claim 1, wherein the electronic circuit comprises the first wireless transceiver, wherein the first wireless transceiver is operable at least in a first mode wherein it reacts to wireless signals from the base unit and in a second mode wherein it does not react to wireless signals from the base unit, and wherein the device controller further is adapted to control the operation mode of the first wireless transceiver in dependence on an estimated disconnection cause.

4. The wireless telephone sound interface device according to claim 3, wherein the device controller further is adapted to alter a power mode of the wireless telephone sound interface device in dependence on an estimated disconnection cause.

5. The wireless telephone sound interface device according to claim 1 and further comprising a motion sensor adapted to provide a motion signal indicating whether the wireless telephone sound interface device is being moved or not, wherein the device controller further is adapted to estimate a disconnection cause in dependence on the motion signal.

6. A wireless telephone sound interface device comprising:
an electronic circuit;
a first wireless transceiver adapted to exchange audio signals with a base unit through a wireless audio connection; and
a device controller adapted to detect a disconnection of the wireless audio connection and to control the electronic circuit in dependence on detecting said disconnection;
wherein said device controller being adapted to estimate multiple predefined causes of a disconnection and to control the electronic circuit in dependence on the estimated disconnection cause; and
wherein the multiple predefined disconnection causes include at least a range-violation cause, indicating that the disconnection was estimated to be caused by an exceeding of the communication range of the wireless audio connection and a user-initiated power-down cause indicating that the user initiated disconnection was estimated to be caused by a user initiated power-down of the base unit,
and a non-user-initiated-power-down cause indicating that the disconnection was estimated to be caused by a power-down of the base unit that was not initiated by the user.

7. A wireless telephone sound interface device comprising:
an electronic circuit;
a first wireless transceiver adapted to exchange audio signals with a base unit through a wireless audio connection and a device controller adapted to detect a disconnection of the wireless audio connection and to control the electronic circuit in dependence on detecting said disconnection,
wherein the device controller further is adapted to estimate a disconnection cause for said disconnection and to control the electronic circuit in dependence on the estimated disconnection cause;
wherein the base unit comprising a second wireless transceiver adapted to exchange audio signals with the first wireless transceiver of the wireless telephone sound interface device and a telephone transceiver adapted to exchange audio signals with a telephone network and/or a telephone gateway;
wherein the base unit further comprises a user interface enabling a user of the wireless telephone sound system to enter one or more predefined commands and a base controller adapted to cause the second wireless transceiver to transmit a predefined wireless signal to the wireless telephone sound interface device in dependence on detecting a predefined user command to power-down the base unit;
wherein the base unit further comprises a base controller adapted to cause the second wireless transceiver to transmit a predefined wireless signal to the wireless telephone sound interface device in dependence on detecting a decrease in the received power; and
wherein the base unit further
wherein the base unit includes an alert signaler adapted to provide visual, acoustic and/or tactile alert signals to a user of the wireless telephone sound system, and wherein the base controller further is adapted to cause the an alert signaler to provide an alert signal in dependence on detecting a decrease in the received power.

8. The wireless telephone sound system according to claim 7, wherein the base unit further comprises a rechargeable power storage adapted to provide electric power to the second alert signaler in dependence on not receiving power through the power interface.

9. A method for operating a wireless telephone sound interface device, the method comprising: detecting the cause of a disconnection of a wireless audio connection between the wireless telephone sound interface device between user intended causes and other user-unintended causes, and a base unit; estimating a disconnection cause of disconnection including estimating a disconnection caused at least a power-down of the base unit controlling an electronic circuit to send an alert to the user of when said other user-unintended causes occur.

10. A wireless telephone sound interface device comprising:
- an electronic circuit;
- a first wireless transceiver adapted to exchange audio signals with a base unit through a wireless audio connection; and
- a device controller adapted to detect the different causes of disconnection between a disconnection of the wireless audio connection resulting deliberate user action and other causes to control the electronic circuit in dependence on detecting said disconnection, and
- wherein the device controller further is adapted to estimate a disconnection cause for said disconnection and to control the electronic circuit in dependence on the estimated disconnection cause and alerting the user only on causes for disconnection which are not deliberately caused;

and wherein the device controller further is adapted to estimate a disconnection cause as one of multiple predefined disconnection causes, the multiple predefined disconnection causes comprising at least a power-down cause indicating that the disconnection was estimated to be caused by a power-down of the base unit.

11. The wireless telephone sound interface device according to claim 10 and further comprising a docking sensor adapted to provide a docking signal in dependence on detecting a mechanical and/or an electrical connection to the base station, and wherein the device controller further is adapted to estimate a disconnection cause in dependence on the docking signal.

12. The wireless telephone sound interface device according to claim 10, wherein the first wireless transceiver further is adapted to provide a power-down signal in response to receiving a predefined wireless signal from the base unit, and wherein the device controller further is adapted to estimate a disconnection cause response to the power-down signal.

13. The wireless telephone sound system comprising a wireless telephone sound interface device according to claim 10 and a base unit, the base unit comprising a second wireless transceiver adapted to exchange audio signals with the first wireless transceiver of the wireless telephone sound interface device and a telephone transceiver adapted to exchange audio signals with a telephone network and/or a telephone gateway.

14. The wireless telephone sound system according to claim 13, wherein the base unit further comprises a user interface enabling a user of the wireless telephone sound system to enter one or more predefined commands and a base controller adapted to cause the second wireless transceiver to transmit a predefined wireless signal to the wireless telephone sound interface device in dependence on detecting a predefined user command to power-down the base unit.

15. The wireless telephone sound system according to claim 13, wherein the base unit further comprises a power interface adapted to receive power from an external power supply and a base controller adapted to cause the second wireless transceiver to transmit a predefined wireless signal to the wireless telephone sound interface device in dependence on detecting a decrease in the received power.

* * * * *